(12) United States Patent
Hed

(10) Patent No.: US 6,238,078 B1
(45) Date of Patent: May 29, 2001

(54) APPARATUS FOR OPTICALLY ENHANCING CHEMICAL REACTIONS

(75) Inventor: Aharon Zeev Hed, Nashua, NH (US)

(73) Assignee: Gate Technologies International, Inc., Boca Raton, FL (US)

( * ) Notice: Subject to any disclaimer, the term of this patent is extended or adjusted under 35 U.S.C. 154(b) by 0 days.

(21) Appl. No.: 09/454,636

(22) Filed: Dec. 6, 1999

Related U.S. Application Data

(62) Division of application No. 09/015,704, filed on Jan. 29, 1998, now Pat. No. 6,043,294.

(51) Int. Cl.$^7$ ...................................................... F21V 33/00
(52) U.S. Cl. ................................ 362/562; 362/556; 522/1
(58) Field of Search ...................................... 362/556, 562, 362/572, 580, 101; 522/1

(56) References Cited

U.S. PATENT DOCUMENTS

| | | | |
|---|---|---|---|
| 5,426,569 | * | 6/1995 | Sopori ................................ 3262/562 |
| 6,043,294 | * | 3/2000 | Hed ........................................ 522/1 |

* cited by examiner

Primary Examiner—Stephen Husar
(74) Attorney, Agent, or Firm—Herbert Dubno

(57) ABSTRACT

Chemical reaction is effected utilizing light of an appropriate frequency supplied preferably via optical fibers to one or more light extractors having light-emissive surfaces in contact with reactants. The light can be concentrated before being delivered. Wave guides and a plurality of such extractors can be provided within the vessel.

5 Claims, 7 Drawing Sheets

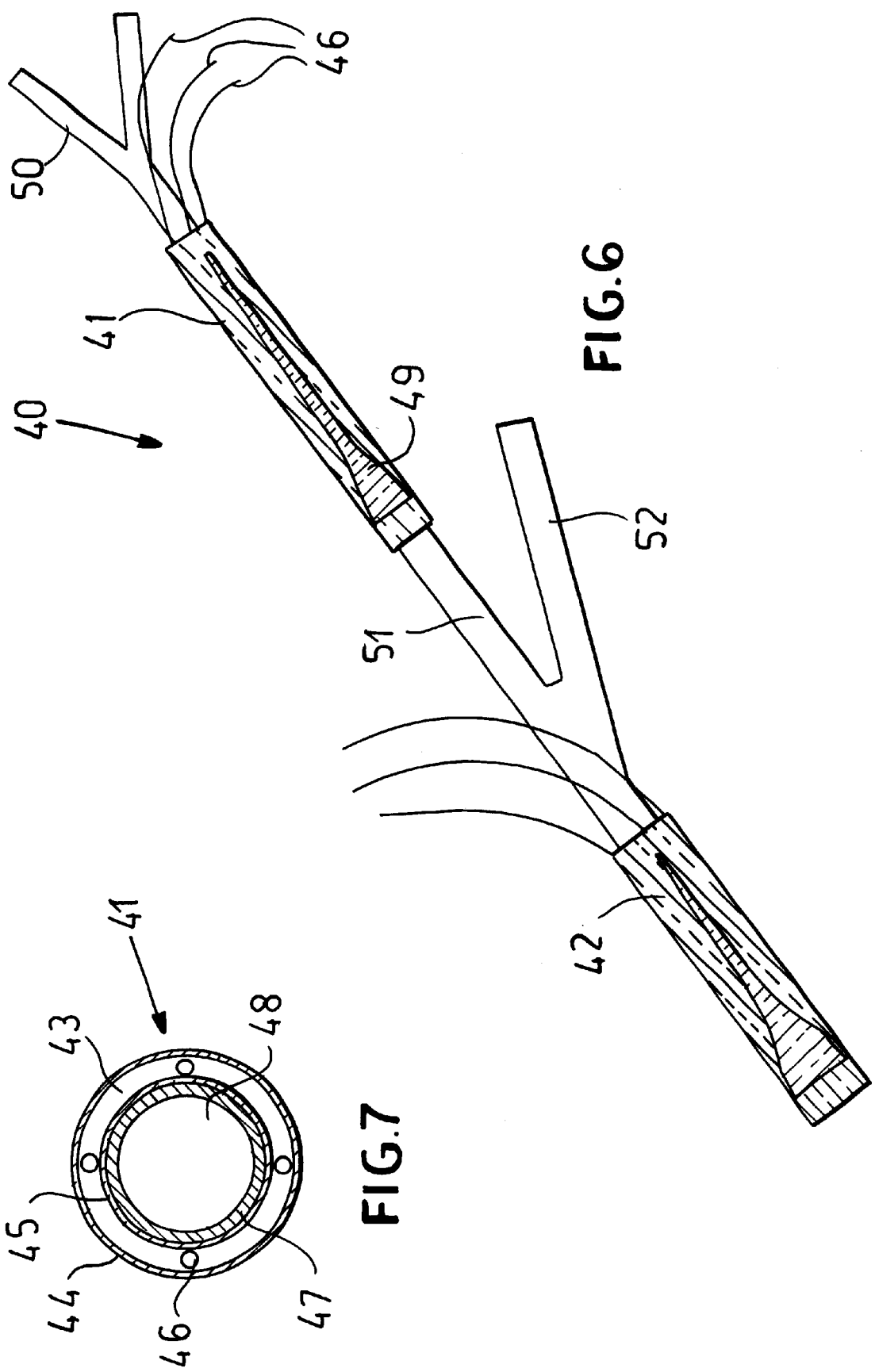

APPARATUS FOR OPTICALLY ENHANCING CHEMICAL REACTIONS

CROSS REFERENCE TO RELATED APPLICATION

This application is a division of Ser. No. 09/015,704 filed Jan. 29, 1998 now U.S. Pat. No. 6,043,294.

FIELD OF THE INVENTION

My present invention relates to a method of promoting or enhancing chemical reactions and to a reactor or apparatus for carrying out such light-promoted or light-enhanced reactions.

BACKGROUND OF THE INVENTION

The use of light to promote chemical reactions has long been known and, in the art of photochemistry, it is known to utilize actinic radiation, for example, to promote polymerization reactions. It is also known to utilize selected frequencies of light to induce chemical decompositions or chemical exchange, substitution or replacement reactions.

For the present application, terms such as "promotion," "catalytic activation" and "enhancement" insofar as they are intended to connote the activation of a chemical species so as to induce, maintain or facilitate chemical reaction are intended to be equivalent and to signify that the reaction may be in part or entirely initiated by the photons of light energy which are supplied, that the photons maintain the reaction after it has been initiated by light catalysis or otherwise, or that the photons provide some other effect which allows a chemical reaction to proceed.

In the past, it has been recognized that many chemical reactions involve the specific "opening" of a given chemical bond in one or more molecules to allow the recombination of such molecules into new compounds. Often such reactions are facilitated by carrying out the reactions on catalytic substrates, typically transition metals or their oxides, and particularly metals of the platinum group. The intermediating action of these substrates is believed to provide the activation of target electron orbitals to allow the reactions, without the substrate actually participating in the reaction. Such catalytic reactions are often subject to poisoning by impurities in that the active sites on the substrate become permanently bonded to, or otherwise affected by the "poisoning" species. Optically enhanced chemical reactions can be considered to be reactions catalyzed via the intermediate activation of orbital electrons or the outright ionization of molecular species. While optical radiation for enhancing chemical reaction rates is not wide-spread in industry, one could classify many polymerization processes as optically enhanced catalytic processes. The use of light in the enhancement of chemical reactions is therefore well known.

One of the problems encountered in the application of light to the enhancement of chemical reactions is due to the fact that if the light source contains wavelengths that are indeed beneficial to a given reaction, it is because the light at these wavelengths is absorbed by the reactants by the interaction with orbital electrons, or by the ionization of the molecules, or by selective breaking of chemical bonds between radicals attached to various host compounds or polymer backbones. This limits the use of such optical activation type processes to relatively thin films, and it has not been possible, to date to carry out such optically activated chemical reactions or optically enhance catalytic reactions in the bulk.

OBJECTS OF THE INVENTION

It is, therefore, the principal object of the present invention to provide an improved method of optically enhancing chemical reactions.

Another object is to provide a reactor which is capable of enhancing chemical reactions.

Still another object of the invention is to overcome the drawbacks of earlier photochemical reaction systems and particularly their limitations to thin-film applications so as to be able to effect photocatalytically-promoted or enhanced reactions in the body of a reactant rather than exclusively in a thin film thereof.

Still another object of this invention is to overcome drawbacks of prior art reaction systems and methods.

SUMMARY OF THE INVENTION

I have now discovered that certain principles developed in my copending application Ser. No. 08/724,069 filed Sep. 30, 1996 and entitled, "High efficiency Compound Parabolic Concentrators and Optical Fiber Powered Spot Luminaire", now U.S. Pat. No. 5,727,108, and in my recent U.S. Pat. No. 5,222,795 entitled, "Controlled Light Extraction from Light Guides and Fibers" can be used with considerable advantage in the promotion and enhancement of chemical reactions to overcome the drawbacks of prior art techniques. More particularly the method of the invention comprises the steps of:

(a) providing a body of at least one chemical reactant in a reaction vessel in contact with at least one light extractor having an emission surface elongated in at least one direction and capable of emitting light over a length of the light extractor;

(b) generating light at a location outside the vessel and including light of at least one light frequency capable of promoting a chemical reaction with the reactant; and (c) modifying the generated light to deliver to the light extractor the light of the light frequency.

The apparatus can be a reactor for effecting a chemical reaction which comprises:

a vessel receiving a body of at least one chemical reactant;

at least one light extractor at the vessel having an emission surface elongated in at least one direction and capable of emitting light over a length of the light extractor, the body of the chemical reactant being in contact with the surface;

means outside the vessel for generating light and including light of at least one light frequency capable of promoting a chemical reaction with the reactant; and means between the means for generating and the light extractor for modifying the generated light to deliver the light of the frequency to the light extractor.

According to the invention, the light extractors which are compatible with the reactants and from which light is extracted over a length thereof can have the configuration described in U.S. Pat. No. 5,222,795. The spacing of the light extractors is selected to optimize photon flux utilization and both the design of the light extractors and the frequency of the light emitted therefrom and the spacing are optimized based upon the absorption spectra of the reactants.

It should be mentioned that while in the prior art, some optically activated reactions have been taught, particularly the UV assisted polymerization of various polymers, these optically assisted reactions have been limited to relatively thin layers that can be easily penetrated by the activating radiation and at a great loss of light resources. The losses in light resources are due to the fact that it is extremely difficult to provide from a point light source a large area of constant light flux. Furthermore, because of the difficulties in delivering efficiently and in a controlled manner activating radiation resources to reactants, the art of optically controlling chemical reaction rates of reactants by tuning the activating radiation or light to excitation potentials of specific molecules involved or to specific chemical bonds of the reactants, has not been practiced to the best of our knowledge. Furthermore, using selective excitation of reacting species enable reactions heretofore difficult to carry out or completely inaccessible to the prior art, in essence providing means for catalytic reactions without the use of any catalytic substrate.

While in the preferred embodiment of the instant invention, an extraction fiber, or optical wave guide as described in U.S. Pat. No. 5,222,795 is employed, it should be clear that the use of other light extractors, while not as efficient, is feasible as well. Such other light extractors have been described by Mori (U.S. Pat. Nos. 4,460,940, 4,471,412 and 4,822,123) and Cheslak (U.S. Pat. No. 4,765,701).

According to a feature of the invention, when two chemical reactants are reacted in a chemical reaction permitted by light of the light frequency resulting from modification of the generated light, at least one and preferably both of the reactants are passed along the light emissive surface and hence along the light extractor or light extractors. The light from the light generator and the light modifier may be delivered to the light extractors at least in part through optical wave guides and the modifying of the generated light may include the step of concentrating the light with an optical concentrator before passing the light through the wave guide. The modifying of the generated light can also include the use of narrow-band pass optical filters or dechroic filters or active optical means that would change or control the spectral quality of the light. Usually a multiplicity of such extractors are disposed in the vessel and the light delivered to the extractors is supplied thereto by respective optical wave guides.

According to the invention and as will be described in greater detail below, the extractors can have cores provided with the emission surfaces and the emission surfaces can be extraction zones over only a limited part of the core. A cladding having an index of refraction lower than the refractive index of the core can cover the nonemissive parts of the core. The cladding is selected to improve light extraction from the core and can also serve as a chemical barrier between the chemical reactants and the core.

In one advantageous construction the extractors are of strip shape and lie in at least one coplanar array or are in the form of a multiplicity of mutually parallel plates. In another construction the light extractors can be tubular and the light is extracted toward the hollow of the tube to effect reactions involving reactants flowing within the tubular structures.

BRIEF DESCRIPTION OF THE DRAWING

The above and other objects, features, and advantages will become more readily apparent from the following description, reference being made to the accompanying drawing in which:

FIG. 6 is a perspective view of a cascade of two tubular chemical reactors;

FIG. 7 is a cross section through one of the reactors of FIG. 6; and

SPECIFIC DESCRIPTION

Figure 1:
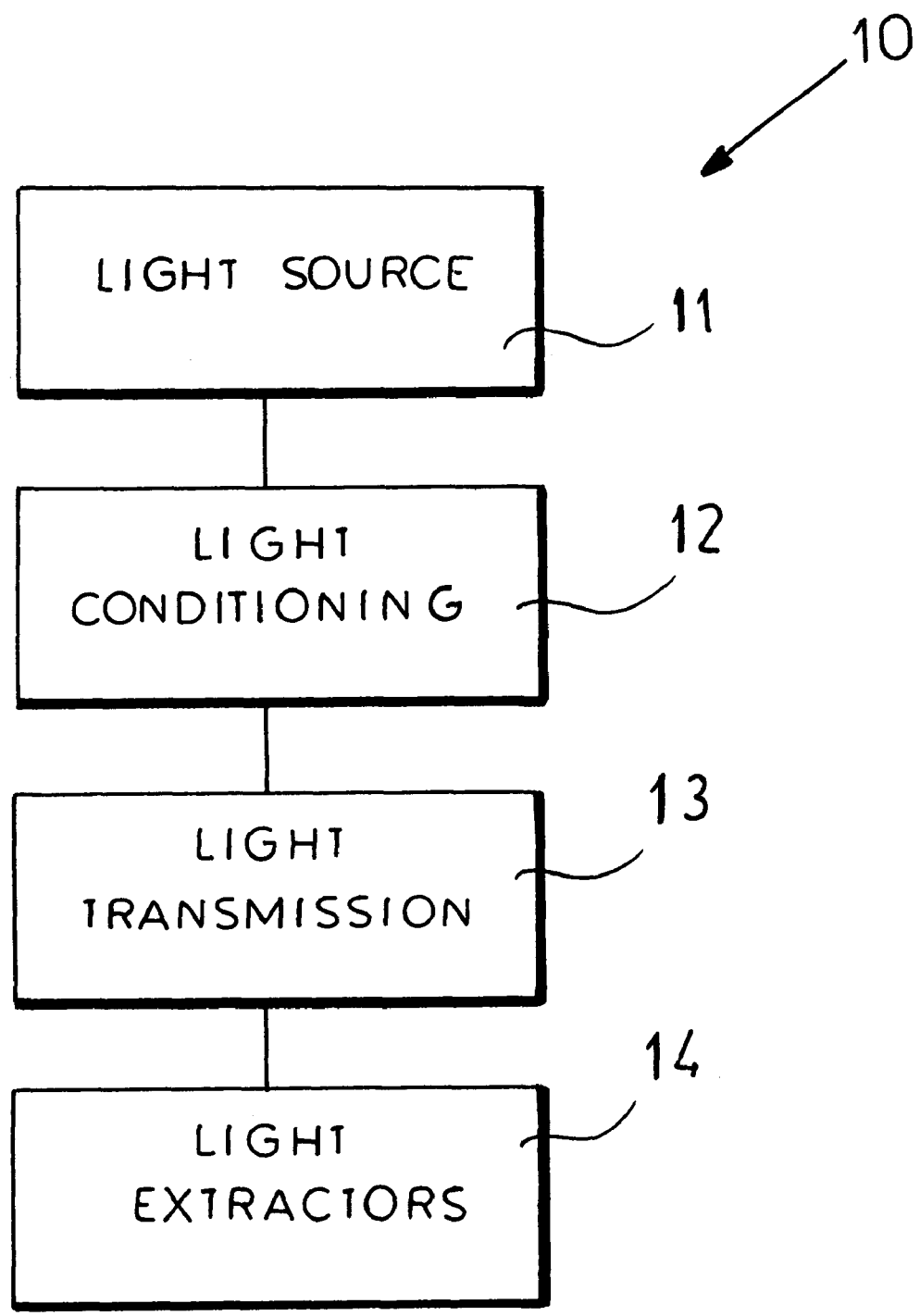
FIG. 1 is a block diagram illustrating principles of the invention.

FIG. 1 shows a block diagram of a typical lighting system 10 that can be used in optical chemical reactors of the present invention. It includes a light source 11, a light conditioning system 12, light transmission means 13 and light extractors 14 used within the reactor.

The light source 11 is selected to have wavelengths that are effective in the desired reactions, for instance if two compounds are desired to be reacted, but in order for the reaction to proceed, some existing bonds need be broken or opened, or specific electrons participating in a bond need be activated, the activation energy for such bonds or electrons will be that corresponding to the wavelength of the impinging light. In some instances, a broad spectrum light source can be utilized (particularly in polymerization reactions) and in other instances very narrow spectral distribution may be desired (for instance when it is desired to obtain an activated species of a certain molecule or an ionized state without activating or ionizing other species). In the former case, the light source can be a high intensity discharge light source and in the latter case, a laser radiating at the appropriate wavelength. It should be clear that to obtain a narrow spectral distribution from a white light source (broad spectrum) one can use filters or dispersion means such as gratings or various prisms as well the latter elements can be part of the light conditioning unit 12, or the light source itself depending on the specific application.

The light is then conditioned and directed into a bundle of optical fibers or other means of light transmission. Light conditioning could involve interposing a filter or a dichroic mirror between the light source and the light transmission system. The light conditioning system can also include a light concentrator to reduce the light beam's cross section so as to enable the use of a smaller cross section light transmission system. The light concentrator can be either an appropriate lens or, a compound parabolic concentrator according to the teachings of the disclosure cited above. Part of the light conditioning function can be achieved in the light source element, for instance by including (particularly for point sources) an appropriate reflector.

The light transmission system 13 is optional, and is used when there is a distance between the light source and the optical chemical reactor. In some embodiments, the light after conditioning can be coupled directly to the light extractors 14.

Figure 2:
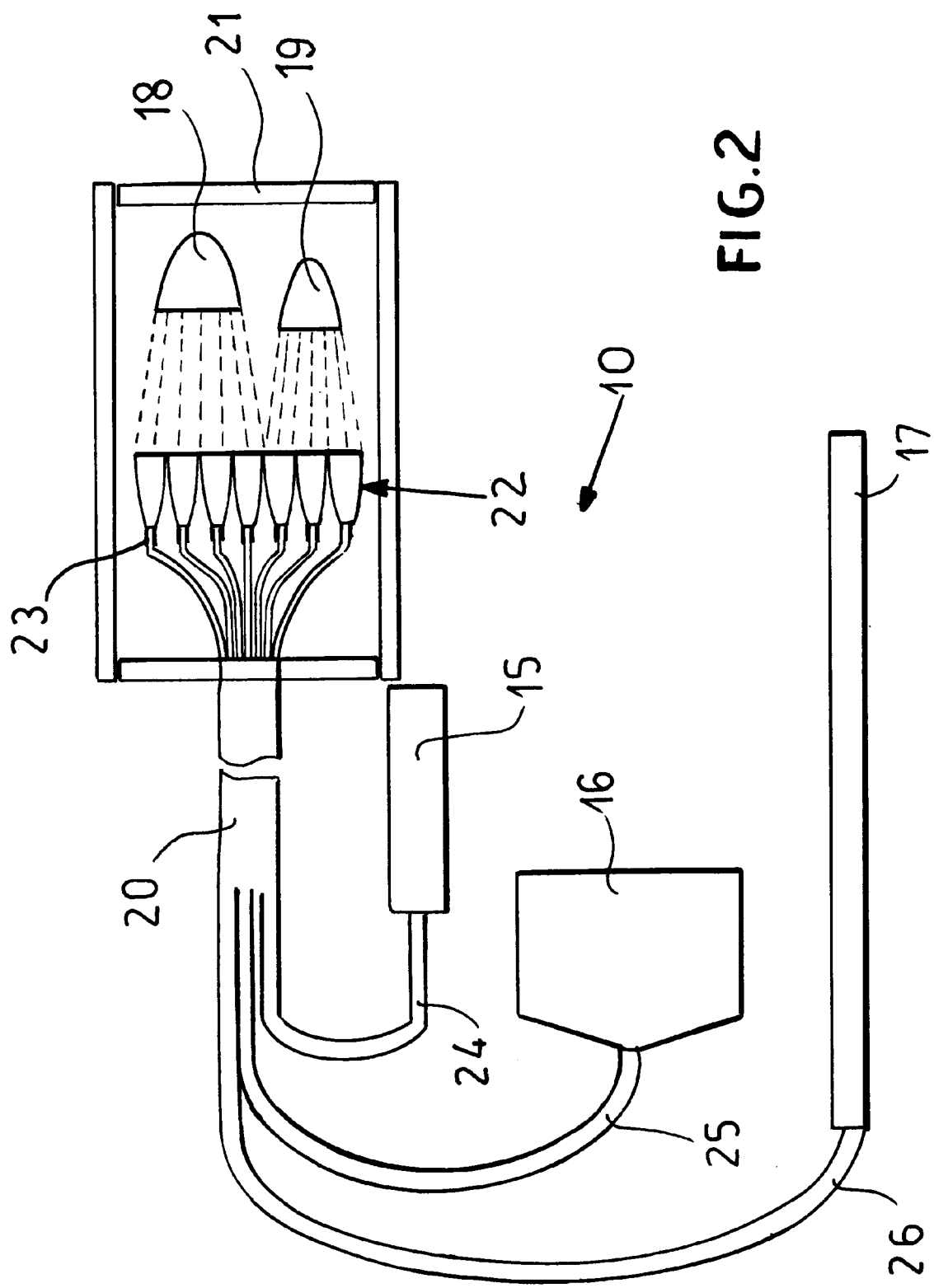
FIG. 2 is a diagram of an illumination system for one or more optical reactors which can be provided with different types of luminaires or independent luminaires for each reactor.

A typical illumination system 10 is shown in FIG. 2. As can be seen, one or more light sources 18 and 19 are coupled to a bundle 20 of optical fibers which then power a variety of luminaire or light extractors 15, 16 and 17.

The light extractors, or as we term these, the luminaires, are made according to the teachings in U.S. Pat. No. 5,222,975 and other pending patents. Light extractors can be made in solid tubular form 17, as strips 15 or as full plates emitting light homogeneously along their lengths, or planar luminaires such as at 16. One can produce such luminaires so they emit light in a relatively narrow angle of emission (for instance when the extractors are tubular) or in a lambertial distribution only from one side of the wave guide that forms the luminaire, as described in FIG. 5, or when the wave guide is flat and the light extraction zones are simply etched in the wave guide, the light is emitted on both sides of the wave guide plane. In some unique applications, it may be desired to have the luminaire hollow and emit light to within the hollow as is described in more details below, such light extractors can be used when optically treating a flow of material within the hollow.

Light extractors comprise, typically, three main elements, a core, at least one light extraction zone and a cladding. Typical core materials will have an index of refraction higher than about 1.5, and examples of such materials are quartz, polymethylmethacrylate (PMMA), polycarbonate polymers, polystyrene and other optically transparent materials. For very unique applications, one can even use single crystal sheets, such as sapphire which is available as thin planar sheath. The core material of a light extractor will preferably have low optical transmission losses in the spectral range of interest.

For many applications, one would have a cladding covering the core of the light extractor. Such cladding has an index of refraction smaller than the index of refraction of the luminaire's core. The cladding material is often a silicon-based polymer, or sometimes a fluorocarbon-based polymer, which has generally indices of refraction about 1.4 relative to the typical index of refraction of 1.5 for quartz and PMMA and about 1.6 for polycarbonate and polystyrene. In some applications, a claddless light extractor may be used. The light extractors, or at least those parts in contact with the reactants and their products of reaction are typically made of materials capable of withstanding the environment in which they operate. Thus for claddless light extractors, one find quartz to be a good core material and when cladding is used, various forms of fluoropolymers including Viton (from the Dupont company) or THV (a TEE/HPF/VDF terpolymer from 3M corporation) can be used.

Within the enclosure 21 respective light sources 18, 19 can be provided which can illuminate light collectors 22 which can be light concentrators working into the input ends 23 of optical wave guides, i.e. optical fibers, 23 forming the light transmission bundle from which are branched the optical fibers 24, 25, 26 to the respective luminaires.

Figure 3:
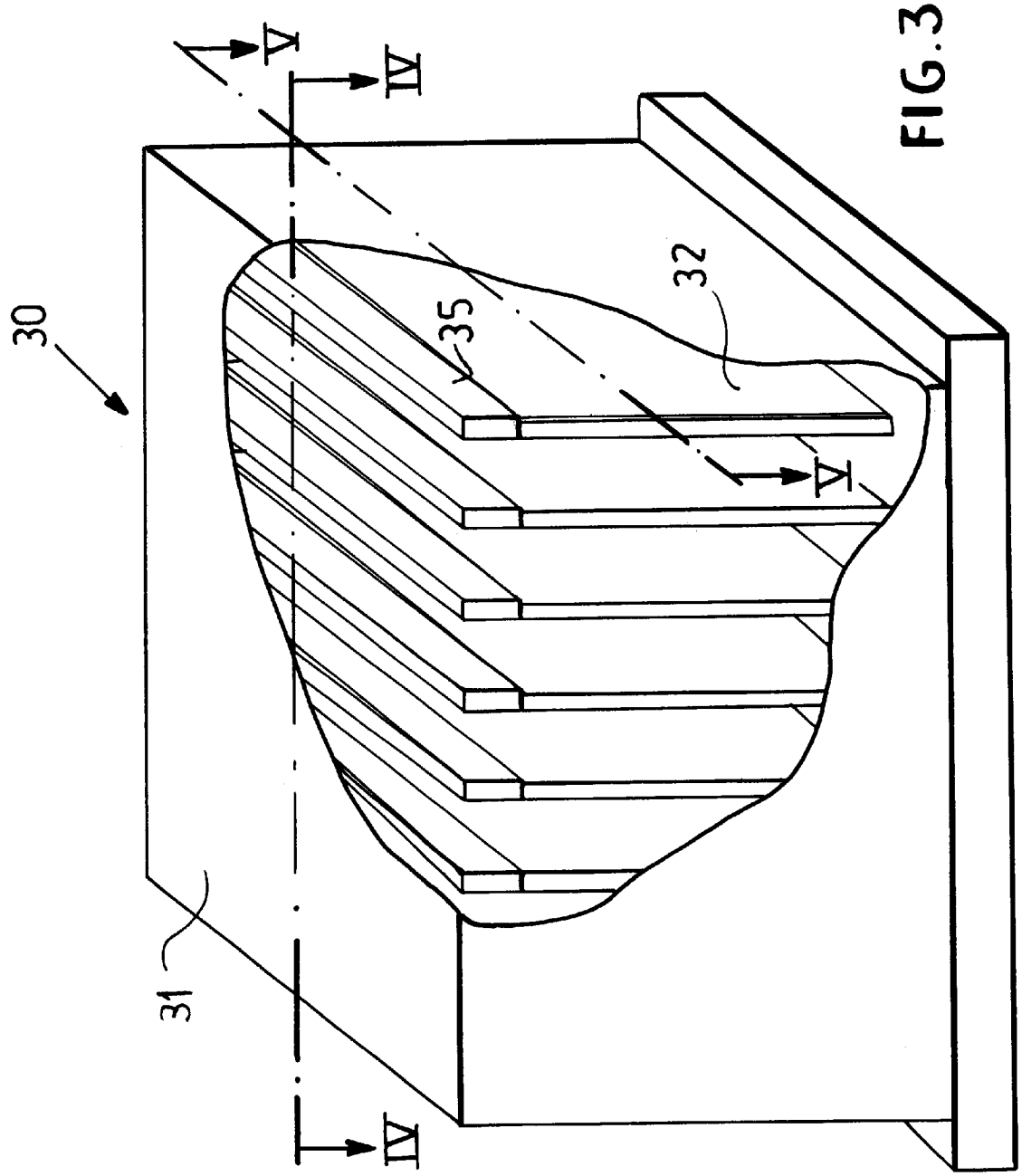
FIG. 3 is a perspective view, partly broken away showing a reactor according to the invention.
Figure 4:
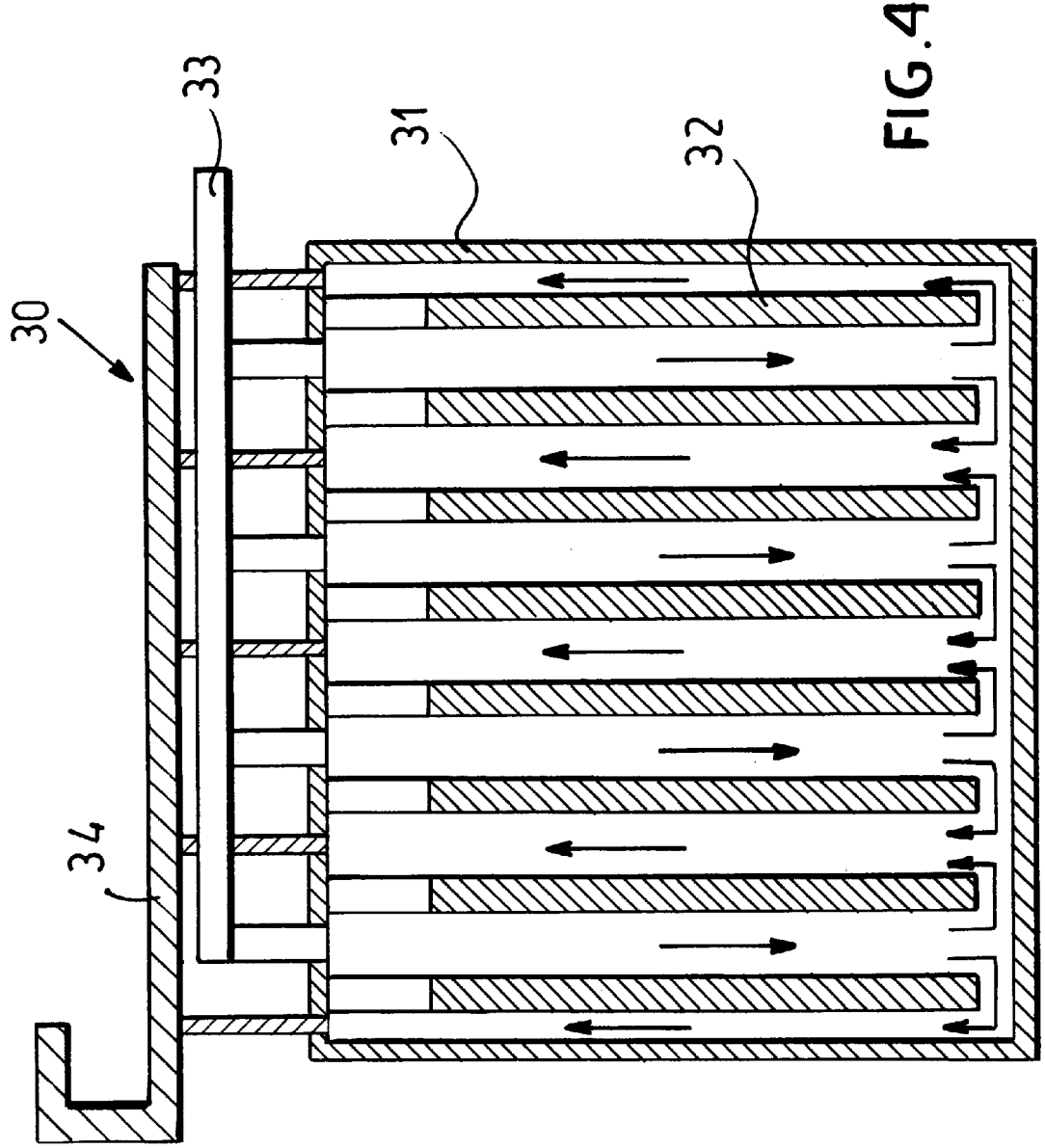
FIG. 4 is a cross section taken along the line IV—IV of FIG. 3.
Figure 5:
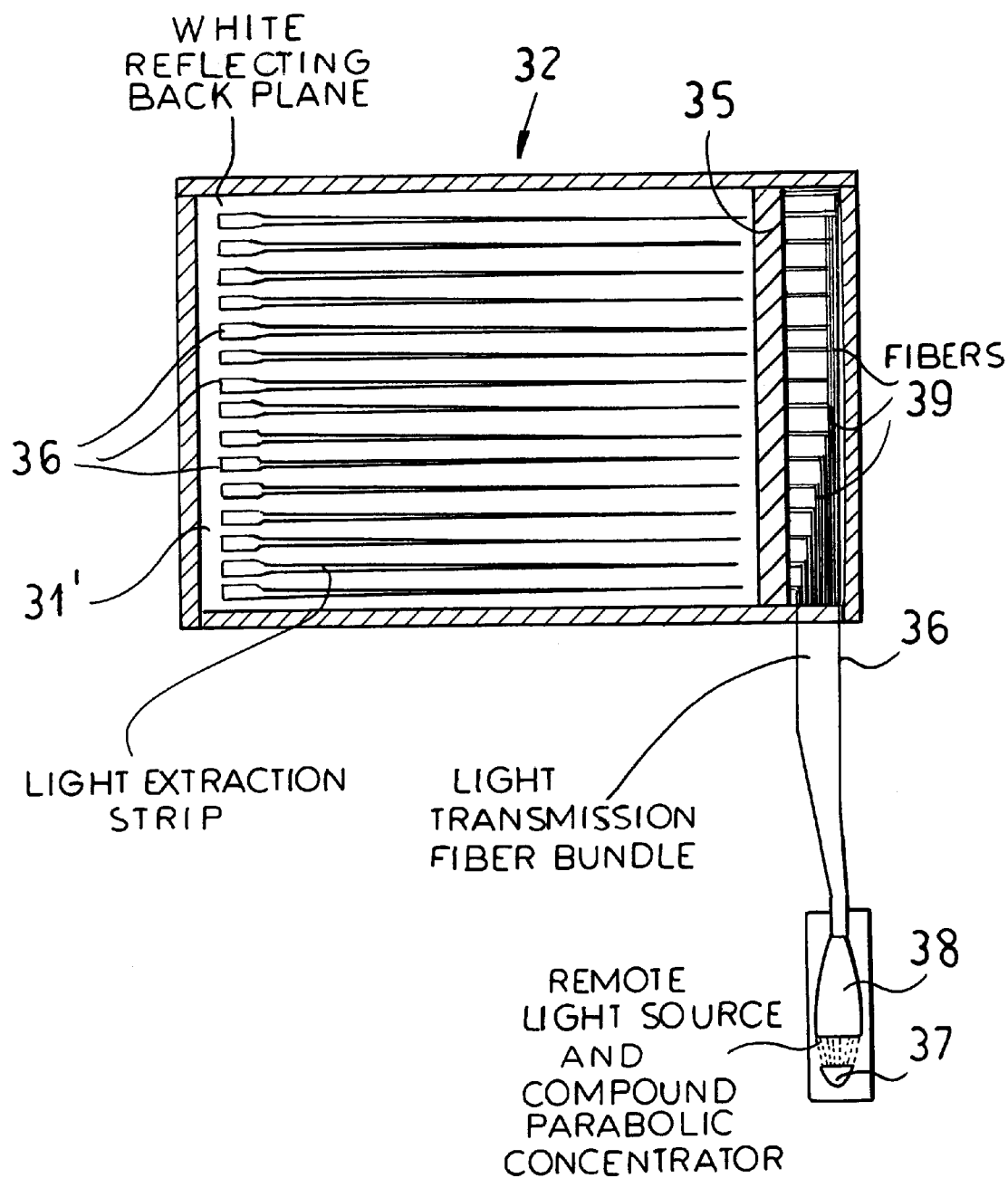
FIG. 5 is a cross sectional view taken along the line V—V of FIG. 3.

A typical continuous optical chemical reactor 30 in which optically enhanced catalytic reactions can be carried out is shown in FIG. 3. In a container 31, a plurality of planar luminaires 32 are positioned with free space between adjacent luminaires. In FIGS. 4 and 5 I show cross sections through a luminaire. In this depiction the luminaires are unidirectional, with optical fibers powering each luminaire at the top. Typically, reactants would be introduced through a manifold 33 (following the arrows going down) between two luminaires and return back up on the other side of the luminaires and be withdrawn through a manifold 34. The feed manifold can comprise a plurality of reactant manifolds so as to mix the reactants either upstream of the reactor or within the reactor.

The light extractors 32 are powered in this embodiment from an appropriate light source with the help of a bundle of optical fibers arranged as an optical connector 35. The light extraction plate can be unidirectional or bidirectional. In the former case, described in FIG. 5, light extraction strips or light extraction zones 36, designed for instance, according to the teachings of U.S. Pat. No. 5,222,795 or by any other appropriate method of extracting light from optical wave guides along the length of such wave guides. The light extraction zones are applied directly on the wave guide cores and then the cladding is applied. The back side of the light extractor has a back plane white lambertian reflector applied on the outer surface of the cladding.

When it is desired to have a bidirectional light extractor, one uses as extraction zones 36, etching or abrasion of the core of the light extractor before cladding, and thus light is extracted from both sides of the light extractor. It should be self evident that one can use two unidirectional light extraction plates back to back and power the upstream surface with light having one wavelength and the down stream light extractor with light having a different or a set of different wavelengths.

In operation, the reactor 30 is fed through the feed manifold 33 with appropriate reactants which under the influence of the electromagnetic excitation by the light emitted from the light extraction elements 32, combine to produce the desired product from the reactants. In essence, the excitation radiation acts selectively on specific orbitals or radical bonds in the reactant molecules, providing for an optically induced catalytic reaction. The product of this reaction is now collected through manifold 34 so as to undergo additional processes (such as separation of the product from unreacted reactants) or subsequent processing step, which can include additional reactions in a cascade manner in additional optical chemical reactors of the present invention.

One of the advantages of the present invention is the controlled dosing of the activating radiation and the ability to deliver the radiation over the large surface. Typically, reactants involved in optically activated reactions will have strong absorption in the spectral range of interest (otherwise, the interaction between the electromagnetic radiation and the reactants would be minimal), and it would therefore be difficult to apply optical activation to bulk material from a point source due to the exponential decay associated with such absorption. However, in the instant invention, the light screens can be positioned in such a way that the light is well distributed within the reactants avoiding most of such exponential decays. Furthermore, when using the light extraction technology described in U.S. Pat. No. 5,222,795, one can control the extraction rate of the light along the light extractor to match the expected dose requirement along the path of the reacting species further increasing the efficiency of using the optical activation process.

One can also conceive of an optical reactor 30, as described in FIG. 3 in which a cascade reaction is desired, for instance, the first set of reactants may be introduced at one point (as in FIG. 3, at the top of the reactor) and another set of reactants is introduced later in the process, for instance at the bottom of the reactor, before the flow back on the upstream part of the cycle. Furthermore, as mentioned above, a dual luminaire can provide for a different spectral composition of the activating radiation to the two part cascade reactor.

In FIG. 5 a fiber bundle has been represented at 37 and the fibers thereof receive light of appropriate frequency from the light source 37 and the compound parabolic concentrator 38, the fibers 39 of the fiber bundle 36 running to the light extraction strips 36 which are disposed against a white reflecting pack plane 31'.

While in FIGS. 3 to 5 the reactor has planar light sources, it should be clear that tubular structures where the fluid reactants (liquids or gases) pass through the hollow of the tube, and the tube itself is made from an optical material into which light is injected at one point and extracted along a reaction zone with the help of light extraction means as discussed above. An example of such a reactor is shown in FIG. 6. Specifically, a cascade optical reactor 40 consists of two tubular structures 41 and 42 made of optically transparent material.

The wall of the tubular structure is the optical waveguide from which light is extracted and is made sufficiently thick to allow injection of light at its proximal end. A cross section through the proximal end of the tubular reactor 41 is shown in FIG. 7, where the optically transmitting core 43 is shown, this core, as stated, serves as the optical wave guide for the activating optical radiation. On the external surface of the core are applied light extraction zones (which at the distal end will coalesce into a solid extraction zone) which are coated with a cladding 44. An inner cladding 45 is provided having as above an index of refraction smaller than the core's index of refraction, and from a material capable of withstanding the reactants flowing through the hollow 48 of the tubular reactor.

Transparent or translucent fluoropolymers can be used for this purpose. Optical fibers 46 are interfaced to the proximal end of the tubular reactors through an appropriate connector and with an optical adhesive having an index of refraction matching that of the core. Preferably, the core of the optical fibers will have an index of refraction close to the index of refraction of the tubular structure's core 43.

A manifold 50 is interfaced to the inner side of the tubular reactor 41 to feed a number of reactants to the optical reactor (while only two inputs are shown, it should be clear that the feed line 50 can have a number of independent feeds each with their own appropriate flow control devices which are not shown). The output from the reactor 41 is collected through the feed line 51 and it can be the final desired product, or a product that may require additional steps of manufacturing such as an additional optically activated reactant with yet another reactant feed to the second reactor 42 through feed line 52.

In operation, the first reactants are caused to react with the help of the activating radiation emanating from the inner wall of the tubular reactor, in essence providing for an optically catalyzed reaction. To the extent that secondary reactions are desired the process is repeated in a cascade in the reactor 42, and the addition of additional reactants can be achieved. The wavelengths of each of the powering sources for reactors in cascade can be dissimilar to enhance the specific reaction desired.

While in the above families of optically assisted catalytic reactors, continuous flow processes are contemplated, it should be clear that batch processing is feasible as well without deviating substantially from the essence of the invention. For instance, one can use a reaction vessel in which a plurality of tubular light extractors 17 are provided as described in FIG. 2. Such light extractors can be designed to emit light radially into the reactant-containing vessel and carry out the reaction in batches. Of course, the reactor described in FIGS. 3 to 5 can be used in a batch fashion as well.

Since the light powering the various light extractors in optical chemical reactors of the present invention is transmitted to the cores through independent fibers, one can provide a plurality of tuned light sources to act either simultaneously to catalyze the desired reaction or sequentially in time to catalyze a number of sequential reactions.

Some examples of unique reactions enabled using the optical catalysis chemical reactors of the present invention vary from standard accelerated oxidation in which molecular oxygen is converted partially to delta singlet oxygen by irradiating the flowing gas with the target oxidant at a wavelength somewhat above 1.25 micron, the excited state above molecular oxygen of delta singlet oxygen, to the synthesis of ammonia from optically activated mixtures of hydrogen and nitrogen molecules. Other reactions that can be carried on using the optically enhanced catalytic methods and reactors of the present invention involve the optical fractionation of hydrocarbons. Other reactions involve the grafting of various selected radicals on other organic compounds, either in flowing bulk, or on existing surfaces to impart to such surfaces unique properties.

Other applications involve the separation of isotopes, for instance deuterium from hydrogen bearing species using the fact that the ionization potential of molecules containing deuterium (such as molecular hydrogen, water vapor or low molecular weight hydrocarbons) differs slightly according to the molecule's content (or lack thereof) of the heavier hydrogen species. By tuning the activating wavelength the ionization potential (usually slightly higher than the lighter isotope) of the deuterium bearing compounds can be matched. One such method could involve the ionization of the target isotope bearing molecules (and only such molecules) and having in the mixture a secondary species that preferentially react with the ionized species and that can be easily separated from the flowing mixture. As an example, one can carry the reaction at low temperature where the isotope bearing species is still gaseous (for instance deuterium bearing methane) and catalytically (including optical catalysis of the present invention) combine the ionized species with oxygen thus allowing the resulting water to precipitate as deuterium rich ice and the carrier methane and carbon dioxide to be withdrawn in the gas phase. Such a process will greatly reduce the cost of heavy water used in a number of nuclear reactors.

Similar techniques for isotope separation can be used for elements using relatively simple compounds for the isotopes which are preferably either in the gaseous or liquid state at the reactor's temperature. Such other isotopes could include the isotopes of uranium, when the gaseous molecule would be $UF_6$, or titanium, using $TiCl_4$ and many other elements for which one can easily obtain either a volatile or a liquid molecular compound. Here as well, the separation can be carried out by oxidation of the ionized species which are solid at the reaction temperatures.

EXAMPLE 1

Optically Enhanced Chemical Grafting

During the last two decades there has been increased use of composite materials as structural elements. Engineering thermoplastic composites are particularly advantageous but their use in composite materials is limited because they contain no reactive chemical groups to form covalent bonds with the reinforcing fibers. This is of particular importance when the reinforcing fiber is a polyaramid like Kevlar®.

Figure 8:
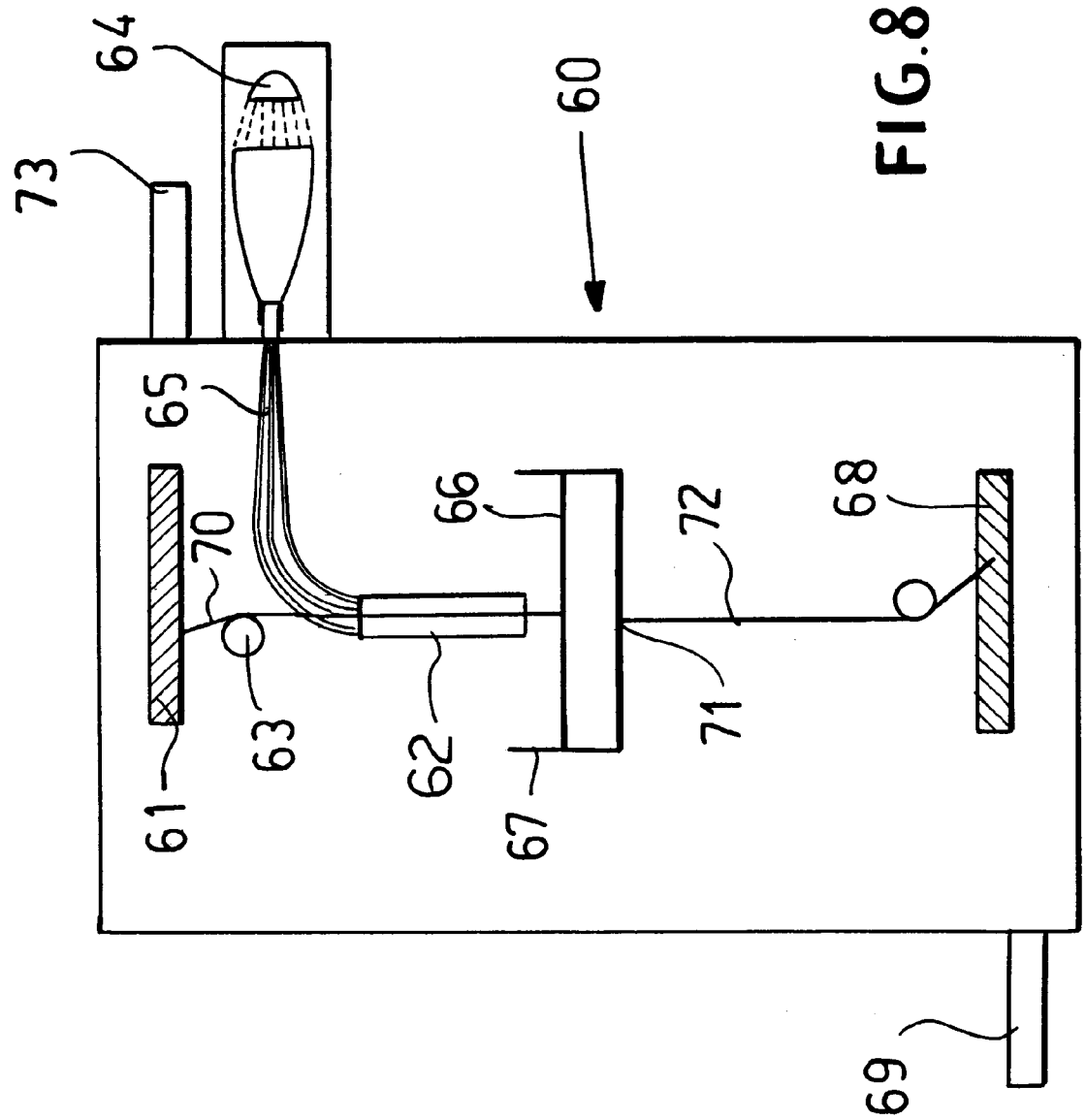
FIG. 8 is a diagrammatic vertical section through a thread or yarn coating reactor according to the invention.

FIG. 8 shows a system for coating polyaramid fibers with thermoplastic material and forming a grafting chemical bond between the aranid and a first layer of the thermoplastic matrix. In this example the fiber is Kevlar® 49 (DuPont) and the thermoplastic is Lexar® 121 polycarbonate (General Electric, in pellet form). The reactor 60, is a chamber, preferably a vacuum chamber, in which a take-off spool 61 with the Kevlar® fiber 70 wound thereupon is positioned above a tubular optical excitation reactor 62. The fiber is held in its correct place above the tubular reactor with a Teflon® coated eyelet 63. The tubular optical reactor 62 is powered from a UV light source 64 through a bundle of quartz fibers 65.

The polyaramid fiber passes through a molten mass 66 of the thermoplastic material (the same type of material that will serve as the matrix in the fiber reinforced final ware) contained in a heated vessel 67 having a bottom perforation 71 through which the now coated fiber 72 exits the coating system. The coated polyaramid fiber is now collected on a collection spool 68.

In operation, the vessel 60 is first evacuated to about 0.01 torr through an evacuation port and then, while the vacuum is on oxygen is bled in through another bleed port 73 to bring the atmosphere within the vessel 60 to a dynamic oxygen level of about 0.1 torr. The UV reactor apparently enhances the formation of dangling oxygen and possibly other bonds on the usually inactive aramid surface and when the activated polyaramid fibers passes through the molten polycarbonate thermoplastic, a covalent bond is established thus enhancing transfer of loads from the final ware matrix to the polyaramid fiber, and in essence, allowing the chemical grafting of the thermoplastic matrix on the polyaramid fiber.

EXAMPLE 2

Fractionation of Long Chain Polymers

For this example a reactor as described in FIGS. 3 and 4 is used, with quartz light extraction plates (about 2 mm thick from Heraus, Germany). The extraction zones are etched with hydrofluoric acid through a silk screened wax pattern. The wax pattern is then dissolved in benzene and rinsed with isopropyl alcohol. The light extractors are then coated with a cladding of THV-200P, a TFE/HPF/VDF Terpolymer (from the 3M Corporation) dissolved in MEK (methyl-ethyl-ketone). The light source used is a Cermax Xenon illuminator (from ILC Technology) with a variable wedge filter (1 nanometer bandwidth) in the range of 400 to 450 nanometers and blocking filters below 400 nanometers and above 450 nanometers. The system described in FIGS. 3 and 4 is also equipped with percolating orifices at the bottom of the vessel, through which hydrogen is slowly percolated into the reaction chamber. Unused hydrogen is collected at the top of the vessel and recycled through a system not shown in these Figures.

It has been found that the binding energy along the backbone of a polymer is not only a function of the nature of the bond and the species participating in the bond, but also a declining function of its distance from the "head" and the "tail" of the polymer. Thus tuning an optical source to photon energies somewhat below the bond strength at the head and tail of the polymer will selectively fractionate the polymers at the bonds where photon energies are equal or slightly larger than the midpolymer bonds but will not fractionate the polymer at bonds closer to the head and tail of the polymer.

The feed polymer is a long chain paraffin, the present example, decane ($CH_3(CH_2)_8CH_3$). If we identify the bonds between the carbon atoms along the backbone by their position from each end of the chain, such as $C_1$ for the first and $C_n$ for the nth carbon, we find that the strongest bond, is between the second and third carbon atoms in the chain (specifically 3.0069 ev for decane), this bond (the $C_2$—$C_3$ bond) is the strongest in the chain. The $C_3$—$C_4$ bond strength is 0.2074% weaker than the $C_2$—$C_3$ bond, and the $C_4$—$C_5$ bond is 0.2897% weaker than the $C_3$—$C_4$ bond. The next bond is the $C_5$—$C_5$ bond and is 0.3705% weaker than the $C_4C_5$ bond.

In the present example the light source is tuned to the wavelength of 415.8 nanometer with the rotating wedge filter. The $C_4$—$C_5$ bond strength corresponds to a wavelength of 414.39 nanometer (2.992 ev) and the $C_5$—$C_5$ corresponds to a wavelength of 415.92 nanometer (2.981 ev). Decane molecules exposed to the light emanating from the extraction plates are cleaved mostly into two pentane molecules and some methane (the $C_1$—$C_2$ bond at 2.947 ev is weaker than the $C_5$—$C_5$ bond and some cleavage of end carbon atoms occurs).

Typically the outgoing stream exits at about 50° C., where decane is still in the liquid phase but both pentane and methane are gaseous, allowing easy separation of the uncleaved decane from the gaseous mixture of pentane and methane. The uncleaved decane is recycled for secondary processing in the reactor, while the gaseous stream is chilled in a water based heat exchanger to about 20° C. where pentane liquifies while the methane is withdrawn in the gaseous form.

It should be understood that the same principles of selective fractionation of long chain polymers of any kind can be contemplated as well, providing that the light source is tuned to the appropriate wavelength, and the polymer exhibits similar change with position of the bonds along the backbone of the polymers. Similarly, one can tune the wavelength of the light source powering the chemical reactor to cleave off specific dangling radicals in more complex structures.

I claim:

1. A tubular reactor for carrying out an optically initiated reaction comprising:
    an elongated tube having at least one cylindrical wall defining a space extending from one of said ends to an opposite end of the reactor and formed along a surface of said wall with means for extracting light traversing said wall into said space;
    a source of light capable of initiating said reaction connected to said wall at one of said ends for propagation of said light within said wall from said one of said ends to the other of said ends whereby light is extracted by said light extractor into said space;
    means for introducing at least one reactant into said space at a first of said ends for light-initiated reactions to produce a product; and
    means at a second of said ends for recovering said product from said space.

2. The tubular reactor defined in claim 1 wherein said wall is a light-conductive core formed with a cladding resistant to said reactant and defining a light-extraction zone extending along the length of said core.

3. The tubular reactor defined in claim 1 wherein said means for introducing said at least one reactant is a manifold for supplying a plurality of reactants to said first of said ends.

4. The tubular reactor defined in claim 1 wherein said source is a plurality of optical fibers transmitting light to said wall at said one of said ends.

5. A tubular light extractor comprising a tube formed with at least one cylindrical wall and a cladding on a surface of said wall forming an elongated light extraction zone therealong, said wall receiving light at one end of the tube.

* * * * *